(12) United States Patent
Potnuru et al.

(10) Patent No.: US 10,313,322 B2
(45) Date of Patent: Jun. 4, 2019

(54) DISTINGUISHING HUMAN-GENERATED INPUT FROM PROGRAMMATICALLY-GENERATED INPUT

(71) Applicant: CA, Inc., Islandia, NY (US)

(72) Inventors: Gowtham Sen Potnuru, Hyderabad (IN); Gaurav Kumar, Munger (IN); Mitta Sarath Kumar, Hyderabad (IN); Dwibhashyam V S Chaitanya, Hyderabad (IN)

(73) Assignee: CA, Inc., Islandia, NY (US)

( * ) Notice: Subject to any disclaimer, the term of this patent is extended or adjusted under 35 U.S.C. 154(b) by 180 days.

(21) Appl. No.: 15/256,015

(22) Filed: Sep. 2, 2016

(65) Prior Publication Data

US 2018/0069847 A1 Mar. 8, 2018

(51) Int. Cl.
*H04L 29/06* (2006.01)

(52) U.S. Cl.
CPC .......... *H04L 63/08* (2013.01); *H04L 63/0853* (2013.01); *H04L 63/18* (2013.01); *H04L 67/42* (2013.01)

(58) Field of Classification Search
CPC ................................ H04L 63/08; H04L 67/42
USPC ......................................................... 726/28
See application file for complete search history.

(56) References Cited

U.S. PATENT DOCUMENTS

| | | | |
|---|---|---|---|
| 9,282,098 B1* | 3/2016 | Hitchcock | H04L 63/0884 |
| 2007/0005500 A1 | 1/2007 | Steeves et al. | |
| 2009/0328163 A1 | 12/2009 | Preece | |
| 2010/0229223 A1 | 9/2010 | Shepard et al. | |
| 2011/0209076 A1* | 8/2011 | Saxena | H05K 999/99 715/764 |
| 2012/0291108 A1* | 11/2012 | Talamo | H04L 9/3273 726/6 |
| 2014/0250538 A1* | 9/2014 | Rapaport | G06F 21/31 726/28 |
| 2014/0295927 A1 | 10/2014 | Gross | |
| 2015/0365401 A1* | 12/2015 | Brown | H04L 63/0838 726/7 |
| 2016/0034677 A1 | 2/2016 | Thompson | |

(Continued)

OTHER PUBLICATIONS

Geo captcha—a novel personalized captcha using geographic, http://www.slideshare.net/MeghanaNS/geo-captcha-a-novel-personalized-captcha-using-geographic, Mar. 30, 2014, pp. 1 to 17.

(Continued)

*Primary Examiner* — Trang T Doan
*Assistant Examiner* — Dereena T Cattungal
(74) *Attorney, Agent, or Firm* — Pillsbury Winthrop Shaw Pittman LLP

(57) ABSTRACT

Provided is a process, including: sending, via a first channel, to a client computing device, a challenge of a test to determine whether a human or a computer is generating input; receiving, via a second channel, a response to the challenge, wherein the second channel and the first channel are not both accessible to a client-application in which the response is input, and wherein the test includes an image recognition task by which the response is determined from the challenge; and determining whether a human or computer generated the response based on performance in the image recognition task indicated by the response.

25 Claims, 5 Drawing Sheets

(56) References Cited

U.S. PATENT DOCUMENTS

| | | | |
|---|---|---|---|
| 2016/0055329 A1* | 2/2016 | Akula | G06F 21/36 |
| | | | 726/7 |
| 2016/0070902 A1 | 3/2016 | Malone | |
| 2016/0191505 A1 | 6/2016 | Frank | |
| 2018/0063107 A1* | 3/2018 | Gonen | H04L 63/08 |

OTHER PUBLICATIONS

Geo-reCAPTCHA: Crowdsourcing Large Amounts of Geographic Information from Earth Observation Data, http://dx.doi.org/10.1016/j.jag.2015.03.012, International Journal of Applied Earth Observation and Geoinformation, vol. 40, Aug. 2015, pp. 29-38.

* cited by examiner

DISTINGUISHING HUMAN-GENERATED INPUT FROM PROGRAMMATICALLY-GENERATED INPUT

BACKGROUND

1. Field

The present disclosure relates generally to distributed computing applications and, more specifically, to techniques deployed in such systems to distinguish human-generated input from programmatically-generated input.

2. Description of the Related Art

Often, to protect computer systems, and particularly remotely accessed systems, it is useful to distinguish human inputs (e.g., access requests, like account log-in attempts or account creation attempts) from programmatically-generated inputs (e.g., from spammer scripts). Many abusive use cases rely on scripted computer inputs to overload the system or automatically generate accounts for unauthorized uses. For instance, spammers have been observed using scripts to generate large numbers of email accounts from which to send spam emails.

Virtually any on-line service is subject to similar attacks, and in many cases, these attacks occur at a substantially higher rate than can be processed by humans. For instance, spammers may run scripts that attempt to create tens of thousands of new accounts, while many legitimate users expect system responses for similar requests to take less than a few seconds, e.g., substantial decreases in user engagement have been observed with latency increases on the order of 200 milliseconds.

One common approach to distinguish human-input from programmatic-input is a CAPTCHA ("Completely Automated Public Turing test to tell Computers and Humans Apart"). Typically, a challenge is sent to the remote client device seeking access, along with a user-interface input to provide a challenge response. Ideally, the challenge is of a form that is difficult for computers to correctly answer, but relatively easy for humans. Examples historically have included images with distorted text to be transcribed, or more generally, image recognition challenges (e.g., with a prompt of "which of these five images includes a cat?").

SUMMARY

The following is a non-exhaustive listing of some aspects of the present techniques. These and other aspects are described in the following disclosure.

Some aspects include a process, including: sending, via a first channel, to a client computing device, a challenge of a test to determine whether a human or a computer is generating input; receiving, via a second channel, a response to the challenge, wherein the second channel and the first channel are not both accessible to a client-application in which the response is input, and wherein the test includes an image recognition task by which the response is determined from the challenge; and determining whether a human or computer generated the response based on performance in the image recognition task indicated by the response.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
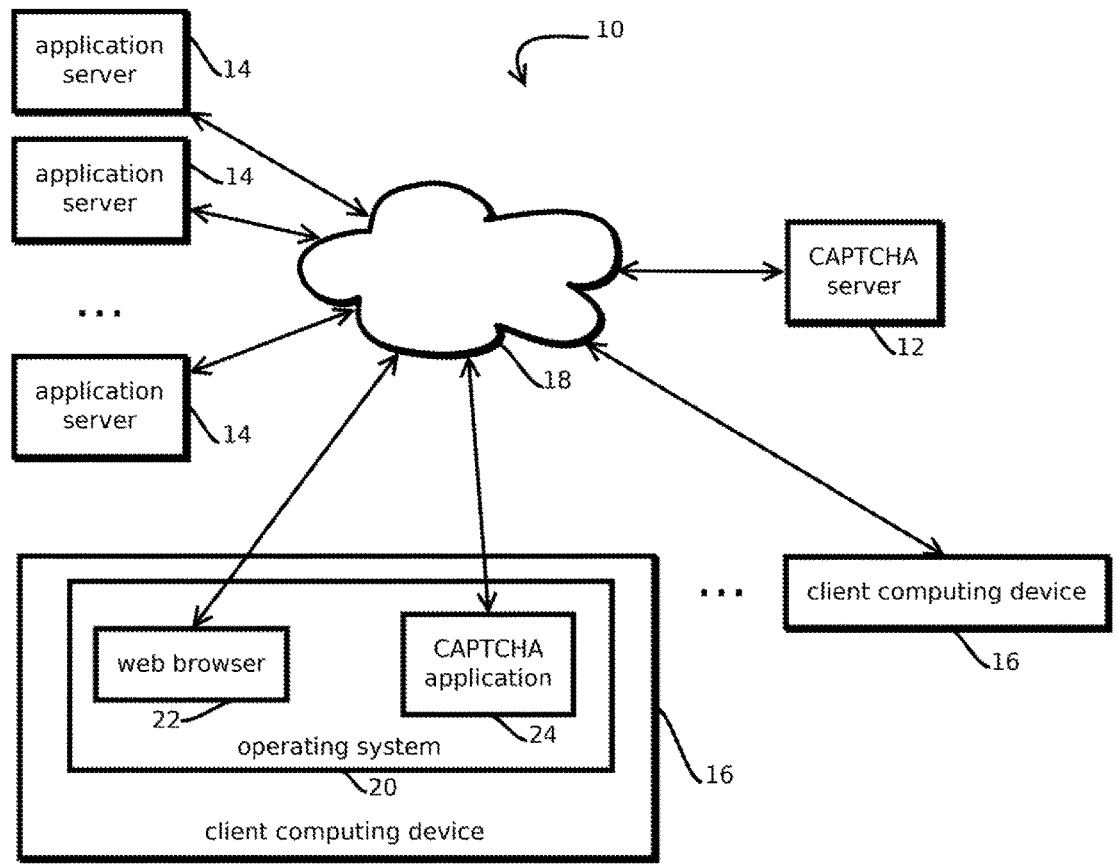
FIG. 1 is a block diagram of an example computing environment in accordance with some of the present techniques.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer security and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In many cases, CAPTCHAs are becoming too easy for computers and too hard for humans. Computers have become substantially more capable. Computer image-recognition algorithms have advanced tremendously, and webpage parsing and scripting tools have become relatively robust. As a result, older CAPTCHAs are expected to be easier to defeat. Attack scripts often relatively easily parse the webpage containing the CAPTCHA to identifying the challenge (e.g., in an image file referenced by the webpage markup) and the response user interface (e.g., an input text box). The attack script generally then executes an image recognition algorithm against the identified challenge and submits the result via the recognized input user-interface.

In response to the efficacy of attacks, many newer CAPT-CHAs have been adjusted to be more difficult, both for computers and, as an undesirable side effect, for humans. For instance, many challenges now have even more distorted text or more obscure and burdensome image recognition tasks than in the past. Indeed, it is expected that eventually, computers will surpass humans in many of the tasks currently used to distinguish the two. Further, these trends tend to apply to other types of CAPTCHAs, like audio challenges, and CAPTCHAs outside of web browsers, like in special-purpose native applications presented on client computing devices (also referred to as "client devices").

To mitigate these issues (and in some cases other issues), some embodiments deprive the attack script of the challenge (or opportunity to enter a response) by conveying the challenge and response via different channels. Some embodiments leverage this barrier to attacks to provide a challenge that is more user-friendly. One particularly user-friendly challenge described below includes asking the user to recognize and select places on a map. In some embodiments, a CAPTCHA server generates a random (e.g., pseudo random, like based on a value obtained with a RDRAND command) map extent that shows a series of locations for user to select in the mode of treasure hunt by giving hints. In some examples, specific instructions in the form of a challenge may be sent to the user's client computing device, prompting the user to navigation across the map, e.g., by selecting a sequence of locations. In some embodiments, multiple challenges may be presented, either sequentially or concurrently, and a user may select multiple regions in a map to provide a response.

Some embodiments may separate the challenge and response into different processes with separate program state in different memory allocations on the client device, so a script configured to execute in one program (e.g., an automated web browser) does not have direct access to the other program state. For instance, some embodiments may execute both a browser and a challenge-agent on the client device. The challenge agent may be a program distinct from the browser and may be configured to request, obtain, and display the challenge without providing access to the challenge to the browser (or browser-related scripts). The browser may receive and render webpages in which responses to challenges are entered and resources are accessed after a successful response. The challenge-agent may receive and present the challenges, without storing the challenge in memory accessible to a script executing in a webpage rendered by the browser (or in some cases, by the browser itself, or by other applications generally). For instance, this information may be protected client side by storing the information outside of the memory address space accessible within a webpage security sandbox, and in some cases, in obfuscated form in memory to impede direct-memory access (DMA) attacks.

In some cases, these or other related techniques may be implemented in a computing environment 10 illustrated by FIG. 1. In some embodiments, the computing environment 10 may include a CAPTCHA server 12, a plurality of application servers 14, a plurality of client computing devices 16, and a network 18, such as the Internet and various intermediary networks, such as local area networks, cellular networks, and the like. In some embodiments, these components 12-18 may cooperate to perform a process described below with reference to FIG. 2 or 4 to produce a map-based CAPTCHA described below with reference to FIG. 3, in some cases with computing devices like those described below with reference to FIG. 5.

In some embodiments, the CAPTCHA server 12 may authenticate (or provide services by which authentication occurs) users of client computing devices 16 on behalf of the application servers 14. In some cases, different entities may operate these different devices at different geographic locations on different local area networks. For example, the CAPTCHA server 12 may operate according to a cloud-based software-as-a-service (SaaS) computing architecture, providing an application program interface (API) to both the application servers 14 and the client computing devices 16. In some embodiments, the application servers 14 may be web servers, API servers for native applications, database servers, or various other servers for distributed applications in which the need arises to authenticate those seeking access as human rather than as scripted bots. In some cases, each of the application servers 14 may be operated by a different entity, for instance, providing a different website hosted on a different domain. Thus, each of the application servers 14 and the CAPTCHA server 12 may be accessible via different domains and different Internet Protocol (IP) addresses, in some embodiments. Or in some embodiments, the CAPTCHA server 12, or multiple instances of the CAPTCHA server 12 may be integrated with respective instances of the application servers 14.

The application servers 14 may serve a variety of different types of applications, including web-based email accounts, subscription accounts, bank websites, and the like. The term "server" is used to indicate that the components 12 and 14 provide services or resources to remote client computing devices 16, but should not be read to indicate that these components must be implemented as a single server process executing on a single thread listening to a single network socket. In some implementations, such components may include both network facing components, like a server process that monitors a port of the computing device and routes response and requests, along with backend logic and data repositories.

In the illustrated case, three application servers and two client computing devices 16 are shown, but it should be understood that the present techniques are consistent with, and commercial use cases likely involve, substantially more instances of these types of devices. For example, some embodiments may include more than 100 different application servers 14 operated by more than 50 different entities, and more than 100,000 client computing devices 16, and in many commercially relevant use cases, well more than 1 million client computing devices 16. In some cases, these servers 14 and devices 16 may be distributed over relatively large geographic areas, such as over an entire continent or over the world. In some cases, operation of these components may be relatively time sensitive, as users often expect relatively low latency responses, particularly for activities like authenticating the user as human that tend to benefit the service provider rather than directly serve the user. Some embodiments may be configured to advance the user through the process of authentication described below with each sequence of operations between user input and responsive system action taking less than five seconds, and in many commercially relevant use cases, less than 500 ms, for example, less than 100 ms. That said, embodiments are also consistent with slower systems and smaller deployments, which is not to suggest that any other feature may not also be varied.

In some embodiments, the client computing devices 16 may be any of a variety of different types of computing devices. In some cases, the client computing devices 16 are desktop or laptop computing devices, or the client computing devices 16 may be various types of mobile computing devices, like cell phones, tablets, wearable devices, in-dash automotive computers, and the like. In some cases, the client computing devices 16 may be special-purpose computing devices, such as kiosks positioned in stores or various embedded systems (e.g., networked home appliances) by which users access services provide the by the application servers 14. In some cases, a single user may be associated with and possess multiple instances of the computing devices 16, e.g., multiple types of the devices.

In some cases, the client computing devices 16 may store in memory and execute various programs, such as an operating system 20, like a desktop or mobile operating system. In some embodiments, the client computing devices 16 may execute multiple instances of an operating system, such as multiple virtual machines, in some cases, with the different applications executing client-side operating in (e.g., exclusively within) those different virtual machines to further separate and protect CAPTCHA responses and challenges.

In some embodiments, within the operating system, on the client computing devices 16, the device executes a web browser 22 and a CAPTCHA application 24. In some embodiments, the web browser 22 is a web browser in which the user has requested access to content or other services provided by a respective application server 14, for example, by seeking to log in or subscribe to a service provided by one of these application servers 14. In other embodiments, the user may seek to access the services via other client-side applications, like a special-purpose native application executing on a mobile computing device. In some embodiments, the web browser 22 may render one or more webpages from one or more of the application servers 14 in one or more browser tabs, which in some cases may each correspond to a different process, such as a thread, executing in the operating system 20. In some cases, each instance of such a process corresponding to a distinct webpage may be executed within a secure portion of the operating system 20, such as in a secure sandbox, in which scripts executed by the web browser (and associated and received with webpages) are constrained from accessing memory outside the secure sandbox, or memory allocated to the web browser or that tab of the web browser. Thus, in some cases, a script, such as JavaScript™, received and executed in the course of rendering one webpage in one tab of the web browser may not access information or program state pertaining to another webpage in another tab of the same web browser or program state stored in memory of the operating system 20 of other applications executed by the operating system 20.

In some embodiments, the CAPTCHA application 24 is a distinct process from the web browser 22, such as a non-web-browser application, like a special-purpose application executed by the operating system 20 for purposes of interfacing with the CAPTCHA server 12. In some embodiments, the CAPTCHA application 24 may be a non-web browser application that is not amenable to manipulation or control by various commonly-used automated browser applications, like Selenium™, often used in automated attacks of CAPTCHAs. In some cases, the CAPTCHA application may be characterized as a thick client application, while webpages rendered within the web browser 22 may be characterized as thin client applications, with the thick and thin designations indicating that relatively more logic pertaining to the operation of the webpage resides remotely in a server, such as an application server 14, while a greater amount of the logic pertaining to the operation of the CAPTCHA application 24 may reside locally on the client computing device 16.

In some cases, the web browser 22 may operate as a separate process from the CAPTCHA application 24, with a separate designated region of memory in the operating system 20 allocated to the web browser 22 and to the CAPTCHA application 24 to prevent the web browser 22 (and in some cases, related scripts) from accessing information pertaining to CAPTCHAs in program state of the CAPTCHA application 24. In some cases, such program state may be further protected by the CAPTCHA application 24 storing program state in encrypted form in memory, for instance, by encrypting values to be stored in certain lower levels of a memory hierarchy before storing those values and decrypting those values when moving those values into the higher levels of a memory hierarchy (e.g., from DRAM up to L2 cache or a CPU register). This is expected to impede attacks based on DMA, though not all embodiments provide this benefit, as multiple independently useful aspects are described. In some embodiments, the CAPTCHA application 24 may execute as a background process in the operating system 20, for example, launching automatically upon the operating system 20 booting. The background process may monitor a port of the client computing device 16 and take responsive action, in some cases, without regard to whether the background process has the focus of the graphical user interface of the operation system.

In some embodiments, both the web browser 22 and the CAPTCHA application 24 may have access to the network 18, but via different channels, for example, via different ports. For example, the web browser 22 may communicate via port number 80 with the application server 14, while the CAPTCHA application 24 communicates over port number to 16,001, or various other unused port numbers. In some embodiments, both the CAPTCHA application 24 and the web browser 22 may communicate via a shared transport control protocol (TCP) connection, but on different ports, or in some cases, the browser 22 and the application 24 may communicate on different TCP connections, for instance, on different sockets and different ports. In some embodiments, the exchanges of the CAPTCHA application 24 may be encrypted before transmission over the network 18 and decrypted upon receipt via the network 18, for example, according to the Transport Layer Security (TLS) encryption protocol. In some embodiments, transmissions and exchanges by the web browser 22 may also be encrypted, for instance, with different encryption keys that are not shared between the web browser 22 and the CAPTCHA application 24 to impede attacks interrogating a buffer of a network interface card to cross communicate between these applications on the client side.

Figure 2:
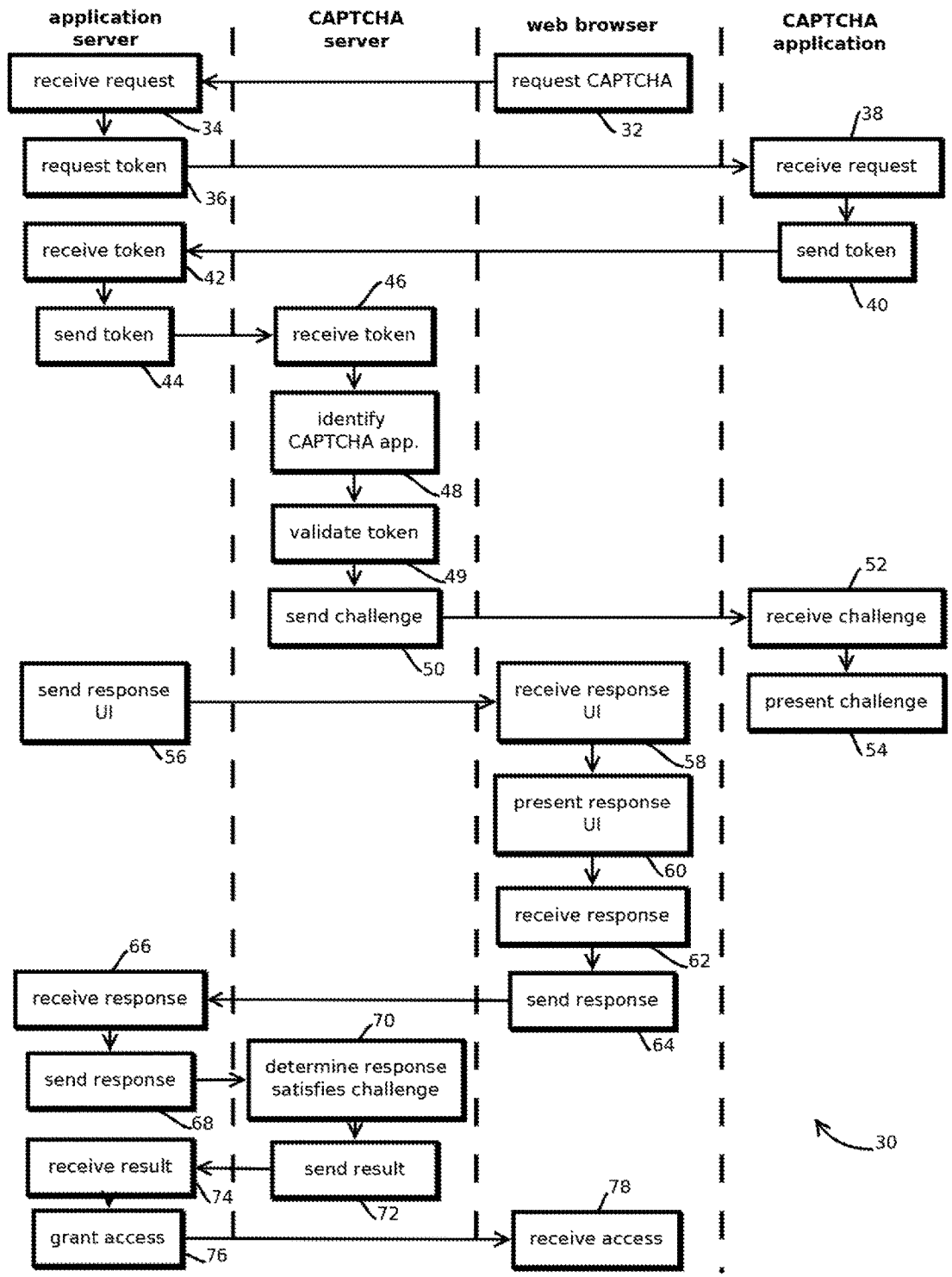
FIG. 2 is a flow chart of an example of a process to distinguish human inputs from programmatically-generated inputs in accordance with some of the present techniques.

As noted, in some embodiments, these components 12-16 may perform a process shown in FIG. 2 to authenticate a user is human. FIG. 2 shows a process 30 that may perform such authentication either with the physical and logical architecture of FIG. 1 or in the context of other systems. In some embodiments, the process 30 may include a web browser requesting a CAPTCHA, as indicated by block 32. In some cases, some other client-side application may request a CAPTCHA, such as a native mobile application or other special-purpose client-side application requesting to access a service provided by a remote application server. In some cases, requesting a CAPTCHA may include requesting a webpage by which a user logs into an account maintained by the application server or requesting a webpage or other interface by which a user enrolls in a subscription or creates an account with such an application server. In some cases, requesting a CAPTCHA may include receiving a webpage corresponding to such a request, and in some cases, the request may be sent via a hypertext transport protocol request (HTTP), such as a GET request to a domain of an application server at which the user is seeking to login or subscribe.

Some embodiments may include the application server receiving this request, as indicated by block 34. In some embodiments, the application server may respond by requesting a token from a CAPTCHA application executed by the same client computing device that executes the web browser, as shown in block 36. In some cases, requesting a token may include sending a request to a designated port or socket and port at the same IP address as the included in a header of a GET request from the web browser.

In some embodiments, the CAPTCHA application may receive the request for a token, as indicated by block 38, and send the requested token, as indicated by block 40. Receiving the request may include monitoring a socket and port designated for the CAPTCHA application by operating system of the client device and parsing the request from received information. In some embodiments, sending the token may include generating a token, for example, generating a value with a private encryption key of the CAPTCHA application that may be determined to be generated by the CAPTCHA application by other devices based on a public key of the CAPTCHA application. In some embodiments, sending the token may include sending an identifier of the client computing device on which the CAPTCHA application is executing, such as an identifier unique within a set of client devices having the CAPTCHA application installed thereon. In some embodiments, sending the token may include sending a token with multiple fields, such as a field that uniquely identifies the sending client device, a field that authenticates the device, and a field that indicates a time at which the token is sent. In some embodiments, sending the token may include also sending the token to the CAPTCHA server, or in the alternative, instead sending the token to the CAPTCHA server. In some embodiments, the CAPTCHA server may be configured to receive tokens from the CAPTCHA application and the application server and compare the respective tokens to confirm that communications from the application server are consistent with those of the CAPTCHA application, e.g., that an identifier, like a session or device identifier, matches between the communications.

Next, the application server may receive the token, as indicated by block 42, and send the token to the CAPTCHA server, as indicated by block 44. In some embodiments, receiving the token 42 may be followed by determining that a token was received and, therefore, that the CAPTCHA application is executing on the client computing device. In some embodiments, the application server 42 may revert to a traditional style of CAPTCHA authentication upon determining that the CAPTCHA application is not executing on the client device. Or some embodiments may decline to authenticate the entity operating the client computing device as human in response to determining that a token is not received or that the token was invalid. Token validity may be determined with a variety of techniques. For instance, the client device may generate an authentication value based on a secret key held by both sides of the exchange, e.g., by calculating a hash with the current time and the value. The receiving device may engage in a similar calculation and determine that the values match, thereby confirming the token to be valid, without resending the secret key over the network.

Next, the CAPTCHA server may receive the token as indicated by block 46. In some embodiments, based on the receive token, the CAPTCHA server may identify the CAPTCHA application executing on the client computing device, as shown in block 48, for instance, identifying the specific client computing device on which the specific instance of the CAPTCHA application corresponding to steps 38 and 40 is executing. In some embodiments, the instance of the CAPTCHA application may be registered with the CAPTCHA server, for instance, by periodically reporting an IP address of the client computing device to the CAPTCHA server along with the identifier that may be included in the token. In some embodiments, the CAPTCHA server may maintain a repository associating such identifiers with the IP address of the CAPTCHA application and the client computing device. In some embodiments, these IP addresses may be stored in a format to facilitate relatively fast retrieval, for instance, sorted according to the identifier to facilitate a binary search, or in some cases in a form of content addressable memory, like a hash table in which the identifier corresponds to an address at which the IP address of the client computing device is stored.

Some embodiments of the CAPTCHA server may validate the token, as indicated by block 49. In some embodiments, this may include decrypting the token. In some cases, this may include determining whether a value encrypted with a private key of the sending device corresponds to a public key of the device.

Some embodiments may determine that the token is invalid and, in response, cease the process 30 and send instructions to the application server that the authentication process is terminated. Alternatively, some embodiments may proceed to the next operation and send a challenge to the CAPTCHA application, as indicated by block 50.

The challenge may take a variety of different forms, including various image recognition tasks. In some embodiments, the challenge is a text prompt that corresponds to an image in a response user interface that is sent to the client computing device. For example, the text challenge may instruct the user to identify or classify content in the user interface of the response user interface according to semantic content. Some embodiments may include a text challenge instructing the user to select a particular item appearing within an image in the response user interface, like instructing the user to draw a box around a lawnmower appearing in an image of a front yard. In another example, the sent challenge may instruct the user to select images depicting a dog, and the response user interface may include a plurality of selectable images, only some of which include dogs. In another example, the sent challenge may include a challenge instructing the user to identify a subset of distorted text in an image (thereby impairing attacks that process the full image of distorted text). An example might include a challenge to enter the word describing an animal in an image of distorted text for "the quick brown fox jumped over the lazy dog" in the response user interface. In some embodiments, assessing text entry may include determining whether the user came within a threshold edit distance of a correct answer.

In some embodiments, sending a challenge may include sending a challenge that includes an image or audio corresponding to a response to be entered in a response user interface. For example, the sent challenge may include instructions to enter a number of cats, a number of dogs, and a number of giraffes appearing within an image in the response user interface. Or some embodiments may send an image and instructions to enter a text description of the image, which may be compared according to keywords known to correspond to the image and used commonly by human beings. Similar techniques may be applied to audio sent with the challenge.

In some cases, some of these challenges may suffer from some of the problems described above that make many traditional CAPTCHA is difficult for users to process, which is not to suggest that those types of challenges are inconsistent with some embodiments of the present techniques. Some embodiments may instead send a challenge that is expected to be substantially easier for users to process and reduce the user's cognitive load relative to more traditional challenges. For example, some embodiments may send a challenge instructing the user to select a location within a representation of a geographic area in the response user interface. For instance, some embodiments may send a challenge instructing the user to select the state of Texas in a response user interface displaying a map of the United States. The cognitive load from these types of challenges is expected to be low enough that users will not mind in some cases iterating through multiple challenges and responses, for instance, a sequence (or concurrent presentation of a plurality) of geographic locations. In some cases, the challenge may explicitly identify the geographic location, such as a geographic area to be selected, for instance, instructing the user to identify a city, street, ZIP Code, municipality, state, country, continent, or region. In some cases, the challenge may instruct the user to identify a geographic location that is not explicitly specified by name but is indicated by semantic value. For example, the challenge may ask the user to "identify the Lone Star State" to indicate the state of Texas, combining both a map recognition task with a semantic analysis task. Thus, some embodiments may send a challenge referring to a geographic location without including a proper noun naming the geographic location. This is expected to further deter automated attacks, as the semantic component adds additional burdens that are relatively difficult for some computers (that said, not all embodiments afford this benefit, as independent useful aspects are described).

In some embodiments, the CAPTCHA application may receive the challenge, as indicated by block 52, and present the challenge, as indicated by block 54. In some embodiments, receiving the challenge may include receiving the challenge in encrypted form and decrypting the challenge. In some embodiments, presenting the challenge may include instructing the operating system to display a pop-up window in which the challenge is visually presented. In some embodiments, presenting the challenge may include instructing the operating system to drive a speaker that emits an audible expression of the challenge. Some embodiments may include a combination of these forms of presentation, for instance, a pop-up interface with text instructing the user to identify the type of animal spoken via audio, with audio indicating the user should identify giraffes in an image in the response user interface. Thus, in some cases, the challenge is presented in a different application on the client computing device from that application by which the user requests to access the application server. This is expected to impede automated scripting attacks, such as those automating web browsers to automatically process CAPTCHAs with image and audio recognition algorithms.

As part of this process, in some embodiments, the application server may send a response user interface to the web browser, as indicated by blocks 56 and 58. In some embodiments, this may be triggered by the CAPTCHA server also sending the challenge to the application server, which may receive the challenge and respond to its receipt by sending the response user interface. In some cases, the CAPTCHA server may send a context for the challenge to the application server, for instance, an instruction to the application server to instruct the client device to display (e.g., in a browser) a particular image, set of images, or the like.

In some embodiments, the CAPTCHA server may send a map extent to the application server, for instance, specifying that the continent of North America should be displayed in a map. The response user interface may take a variety of forms. In some cases, the response user interface includes an image or audio that the user is to classify (or otherwise recognize) according to the sent challenge. In some embodiments, the recognition or classification task (which is not to imply that classification cannot be a form of recognition) may be one that is relatively difficult for a computer to perform but relatively easy for a human user to perform. In some embodiments, sending the response user interface may include sending an event handler configured to receive the user response and return the user response to the application server (or the CAPTCHA server). In some embodiments, the event handler may receive an on-click or click-release event, and in response, report a location within the user interface at which the event is associated (like horizontal and vertical coordinates in terms of pixel position). Some embodiments may handle an on-touch or touch-release event and similarly report a location, such as the number of pixels within the user interface down and to the right of a top left corner of user interface.

As indicated, the web browser may receive the response user interface, as indicated by block 58, and present the response user interface, as indicated by block 60. In some cases, presenting the response user interface may include rendering a webpage having scripting instructions, for example JavaScript™, that specifies an event handler corresponding to a user selection within a portion of an image presented in the response user interface. In some embodiments, presenting the response user interface may include presenting a webpage having a text box input by which a user enters text corresponding to the sent challenge.

Some embodiments may include receiving a response, as indicated by block 62. In some cases, this may include the above-described event handlers executing on the client device detecting a corresponding event, receiving a context of the event (like a number of pixels vertically down and horizontally to the right in a window) at which an event occurred within the user interface, and executing a corresponding event handler routine. In some embodiments, the event handler routine may send the pixel coordinates, or some embodiments may determine a user selection based on the pixel coordinates client-side, for instance, determining whether the user selected a subset of pixels corresponding to a particular geographic area, item appearing in an image, or the like.

Next, in some embodiments, the web browser may send the response back to the application server, as indicated by block 64. In some cases, the response may be sent to the application server rather than the out CAPTCHA server to avoid violating policies enforced by some web browsers that obstruct cross domain exchanges of information, for instance, that prevent a webpage sent from one domain from sending user entered information to a different domain. Or in some cases, the browser may not enforce such a policy, and the response may be sent to the CAPTCHA server.

Next, the application server may receive the response, as indicated by block 66, and send the response to the CAPTCHA server, as indicated by block 68, to determine whether the response is correct. Or in some cases, the CAPTCHA server may send the correct answer to the application server, and the application server may make this determination.

As noted, the CAPTCHA server may receive the sent response and determine whether the response satisfies the challenge, as indicated by block 70. In some cases, the response may be sent from the application server to the CAPTCHA server with the token or a subset of the token that was previously sent to identify a session between the CAPTCHA server and the CAPTCHA application in which the challenge was sent. In some embodiments, the CAPTCHA server may correlate the response with the challenge based on this token or some other session identifier. Based on the correlation, a correct answer may be retrieved from memory for comparison with the response.

Determining whether the response satisfies the challenge may include a variety of different processes, depending upon how much the user input is processed within the web browser and the application server. In some embodiments, some of this processing may be performed upstream, for example, to reduce the amount of information conveyed or distribute processing tasks so that the CAPTCHA server can scale better with larger numbers of users requesting CAPTCHAs.

In some embodiments, determining whether the response satisfies the challenge may include determining that the user identified a geographic area in a map specified by the challenge. In some cases, this may include determining whether the user selected a point within some threshold distance (e.g., within a radius or a threshold horizontal and vertical distance). In some embodiments a radius, or another tolerance, may be user configurable, e.g., such that some embodiments retrieve the configuration setting from memory upon a user selecting a portion of a map, calculate a Euclidian geographic distance from a geographic location of a user selection and a centroid of a region or a border of a region, and determine whether the distance is less than a threshold distance, like a radius. In some embodiments, the tolerance may be expressed in terms of distance in a map extent being displayed, like a number of pixels in a displayed image, or in some cases, the tolerance may be geographic distance in the underlying geographic are depicted in the map extent. In some cases, this may include determining whether the user selected a pixel location falling within a polygon defining boundaries of a geographic area in the map. In some embodiments, the point may be determined to be within the polygon based on a point in polygon algorithm. Some such embodiments may execute a ray-casting algorithm or a winding number algorithm to determine whether a polygon bounds a selection. For instance, some embodiments may sum angles between rays extending from the selected location and vertices defining each side of the polygon. Some embodiments may determine whether the sum is non-zero, indicating the selection is inside the polygon. Some embodiments may calculate such angles according to an inverse trigonometric function, or to expedite processing and avoid computationally expensive calculations, some embodiments may leverage the closed shape of the polygon and simply account for which quadrant each additional edge places each sum. Alternatively or additionally, some embodiments may determine whether a selection is within a polygon by counting a number of times a ray originating at the selection intersects a side of a polygon defining a geographic area. Then, some embodiments may determine whether the count is odd or even. An odd count may indicate the selection is outside the polygon. In some embodiments, each edge of the polygon may be evaluated for intersection with the ray, and vertices may be evaluated for intersection with the ray and tracked in memory as already having been deemed intersected to avoid double counting of vertices for adjacent sides.

In some embodiments, the response may include the user designating an area in the response user interface corresponding to an item, for example, a box defined by the location of an on-touch or on click-event and the location of a corresponding touch-release or click-release event within a window of the graphical user interface. In some embodiments, an image may be tagged with a set of pixels considered responsive to a challenge. For instance, a box selected by the user may be compared to that set of pixels to determine whether more than a threshold amount of the set of pixels are selected by the box. In some embodiments, the determination may include determining whether more than a threshold amount of non-response of pixels are also selected, e.g., some embodiments may determine a ratio between selected responsive and nonresponsive pixels and determine whether the ratio exceeds a threshold.

In some embodiments, the challenge may include a challenge instructing the user to enter a text description of what appears in the image, and determining whether the response satisfies the challenge may include determining whether a semantic similarity between the user entered text and a previously supplied description of the image, for example, by determining whether a latent semantic analysis score exceeds a threshold.

Some embodiments may determine whether the user entered a response that is sufficiently but not necessarily completely correct. For example, some embodiments may determine whether the user entered a response that correctly identified more than a threshold amount of geographic location specified in a sequence (or concurrent presentation of a plurality) of challenges or more than a threshold amount of items appearing in images or more than threshold amount of images. Some embodiments may adjust this threshold based on other indicia of authenticity of the human user, for instance, lowering the threshold in response to determining that a user at the same IP address has previously being authenticated. In some embodiments, determining whether response satisfies the challenge may include a probabilistic determination, for example, accommodating some amount of user error. For instance, some embodiments may require that more than a threshold portion (like count or frequency) of geographic locations sequentially sent in a challenge were correctly identified in a sequence (or simultaneous submission of a plurality) of responses. In some embodiments, thresholds for such probabilistic determinations may be modulated based on other indicia of security, for instance based on whether the IP address is one that has previously been authenticated as being used by a human or based on a rate of request from the IP address.

Some embodiments may maintain a time-stamped log of authentication attempts, e.g., each associated with an IP address of the client device and a results of the attempt. Some embodiments may rate-limit authentication attempts to impede scripted attacks, e.g., by determining whether the log has more than a threshold amount of failed attempts within a trailing duration of time for a given IP address requesting authentication and, in response to exceeding the threshold, blocking the attempt.

Next, some embodiments may send the results of the determination to the application server, as indicated by block 72.

The application server may receive the results, as indicated by block 74 and, if the result is an authenticated human, grant access, as indicated by block 76. Granting access may include permitting the user to log into an account and access services provided by the application server or permitting the user to subscribe to a subscription or create an account for a service provided by the application server. As noted, a variety of different services may be provided, and the web browser may receive access, as indicated by block 78. Receiving access may include accessing various data repositories via the application server and sending and receiving communications via the application server. For example, such services may include various SaaS-based enterprise resource management services, communication services like email or chat, document hosting services, workflow management services, customer-relationship management services, and the like.

Figure 3:
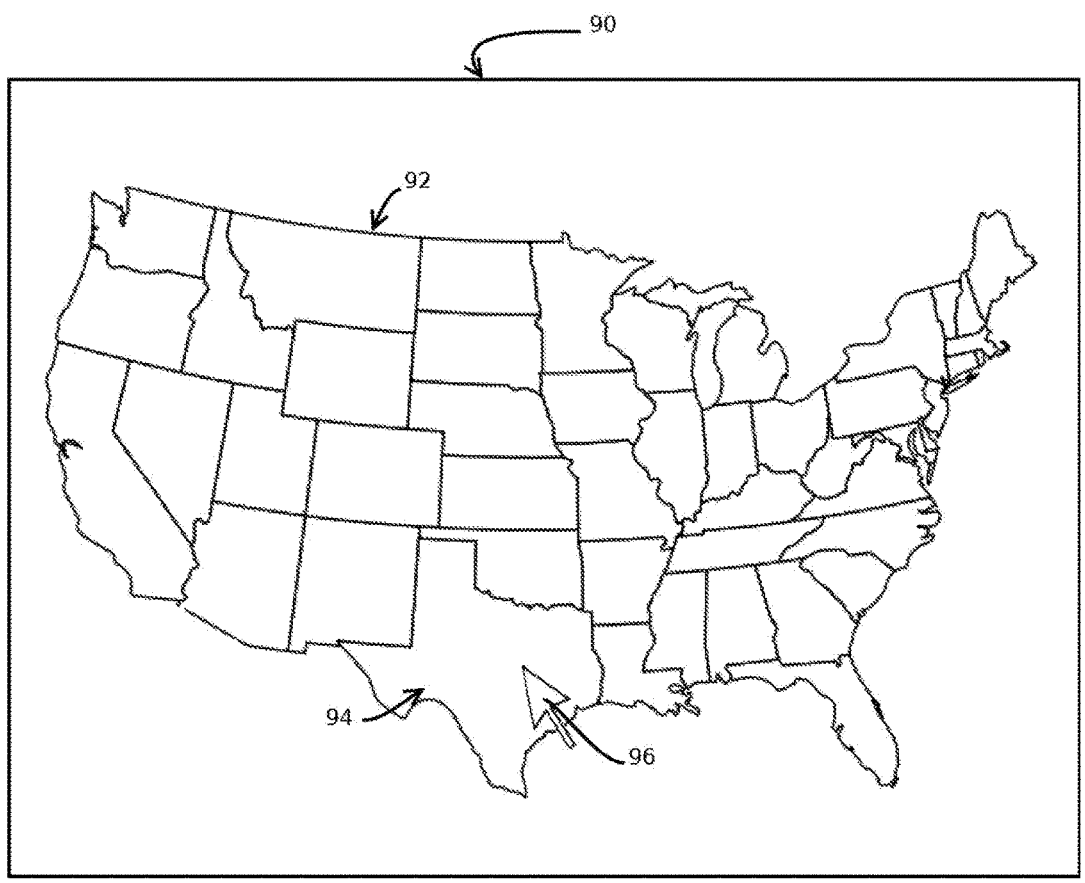
FIG. 3 is an example of a graphical user interface to enter a challenge response in accordance with some of the present techniques.

FIG. 3 illustrates an example of a response user interface 90 that may be presented, for instance, in a web browser, in which a user is seeking to authenticate themselves as human. A challenge, sent via a different channel, may indicate that the user is to select the state of Texas via the CAPTCHA application described above, and the response user interface may display a map of the United States 92 including a region 94 in which a pixel selection corresponding to an on-click event by a pointer 96 corresponds to a correct response to the challenge. As noted, a variety of different types of images may be presented, and a variety of different maps they presented. In some cases, the maps may be presented as flat images, or in some cases the maps may be presented as vector graphics. Some embodiments may receive and respond to user requests to pan or zoom the map to identify a correct selection. In some embodiments, the geographic region presented within the map extent may be selected based on a geo-located IP address of the client computing device to identify geographic regions likely to be familiar to the user, e.g., a region including the user.

Figure 4:
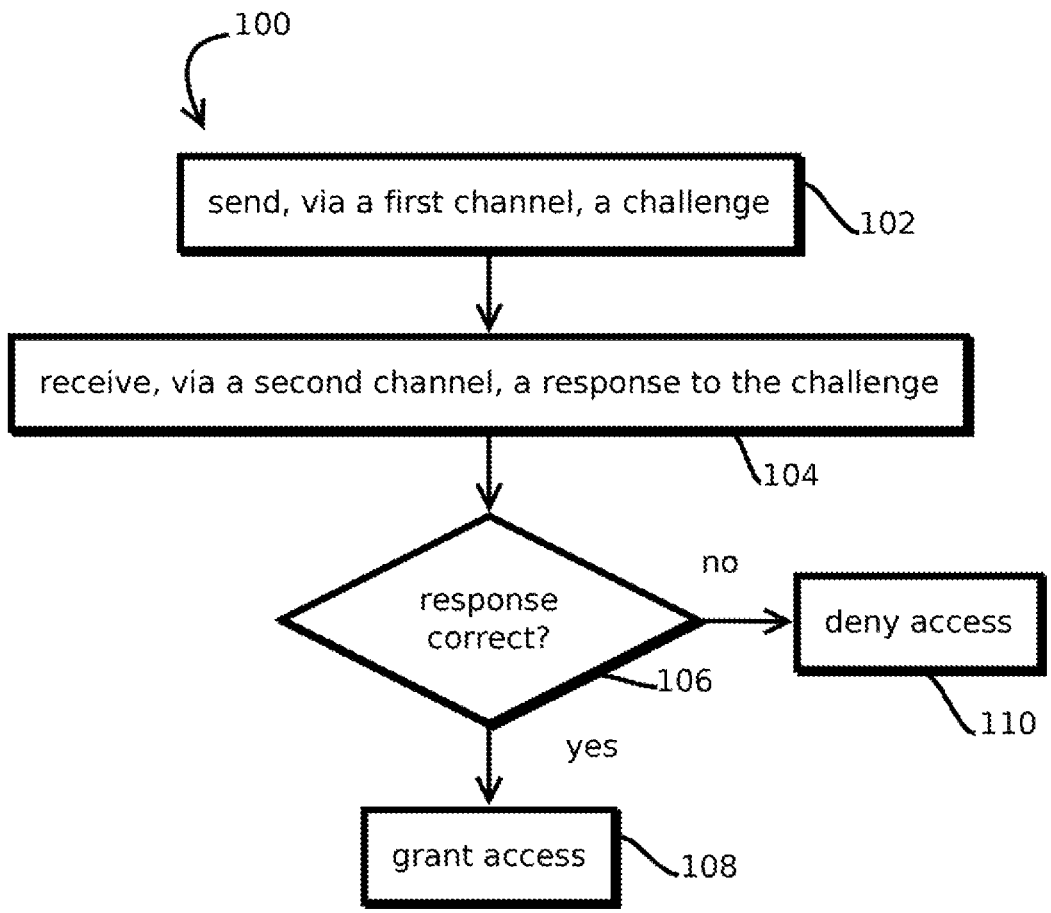
FIG. 4 is a flow chart of another example of a process to distinguish human inputs from programmatically-generated inputs in accordance with some of the present techniques.

FIG. 4 illustrates another example of a process 100 that may be performed by the computing environment 10 described above. The process may be performed by one of the devices described above, e.g., the CAPTCHA server, or in some cases, some or all of the process 100 may be processed by other components, e.g., the application servers or the CAPTCHA applications. In some cases, media storing instructions for the process 100 may be divided among these different entities, e.g., media storing instructions for some operations may be possessed by an entity operating the CAPTCHA server, and media storing instructions for performing other portions may be possessed by an entity operating one of the application servers. Reference to "media" encompass this arrangement. Or, in some cases, media possessed by a single entity, like the entity operating the CAPTCHA server, may store instructions for all of the operations, and that entity may distribute some of the instructions to the other computing devices, like client CAPTCHA applications and application servers, to be executed by those devices. Reference to "media" encompass this arrangement. Similar variations apply to the other processes described above.

This process 100 may include sending, via a first channel a challenge, as indicated by block 102. In some embodiments, the challenge may include a description of an image or audio classification task, like those examples described above. In some embodiments, the challenge may be sent by the CAPTCHA server described above or the application server described above. In some cases, the first channel may be a first port of a TCP connection, a first socket, a first instance of a protocol or media selection in any of the layers in the Open Systems Interconnects (OSI) Model, or a first computing device (or combination thereof).

Some embodiments may include receiving, via a second channel, a response to the challenge, as indicated by block 104. For instance, the CAPTCHA server or application server may receive the response. As noted, the second channel may be a different channel from the first channel. This is expected to impede attacks by automated scripting software that may have access to one channel but not the other. In some cases, the second channel may be a second port of a TCP connection, a second socket, a second instance of a protocol or media selection in any of the layers in the OSI Model, or a second computing device (or combination thereof).

For instance, in some cases, the challenge may be sent to a first client computing device that may be different from a second client computing device in which a response is entered. For example, the challenge may be sent to a mobile computing device, like a mobile phone or wearable device, for instance, via a text message, and the response may be entered in a desktop computer web browser. In some cases, the CAPTCHA server may maintain user profiles linking different channels, and these profiles may be accessed to select a second channel. In another example, both channels may be to the same computing device but different in another way, e.g., one channel may include a particular port monitored by a browser, and another channel may include a different port on the same computing device monitored by the CAPTCHA application.

In some embodiments, the response may be received by the above-described application server or the CAPTCHA server. In some embodiments, the same server may send the challenge and receive the response or different servers operated by different entities on different domains may send the challenge and receive the response.

Next some embodiments may include determining whether the response is correct, as indicated by block 106. Determining whether the response is correct may include the techniques described above with reference to block 70. In some embodiments, the response may be determined correct on one or several computing devices. In some embodiments, determining whether the response is correct may be performed on the client computing device by the CAPTCHA application, on the CAPTCHA server, or the applications servers described above.

In response to determining that the response is correct, some embodiments may grant access, for instance to a distributed application, as indicated by block 108. In some embodiments, granting access and providing services may be performed by the application servers described above. Alternatively, in response to determining that the response is not correct, some embodiments may deny access, as indicated by block 110. In some embodiments, this operation may be performed by the application server, the CAPTCHA server or the web browser described above.

The difference between human-generated input and computer generated input should not be confused to suggest that human-generated input may not be input to, transformed by, and otherwise processed by a computer. Such input stands in contrast to computer generated input in which the information generally obtained via a user interface is instead supplied by a computer program (e.g., exclusively by a computer program, without a human guiding the program in entry of the information).

Figure 5:
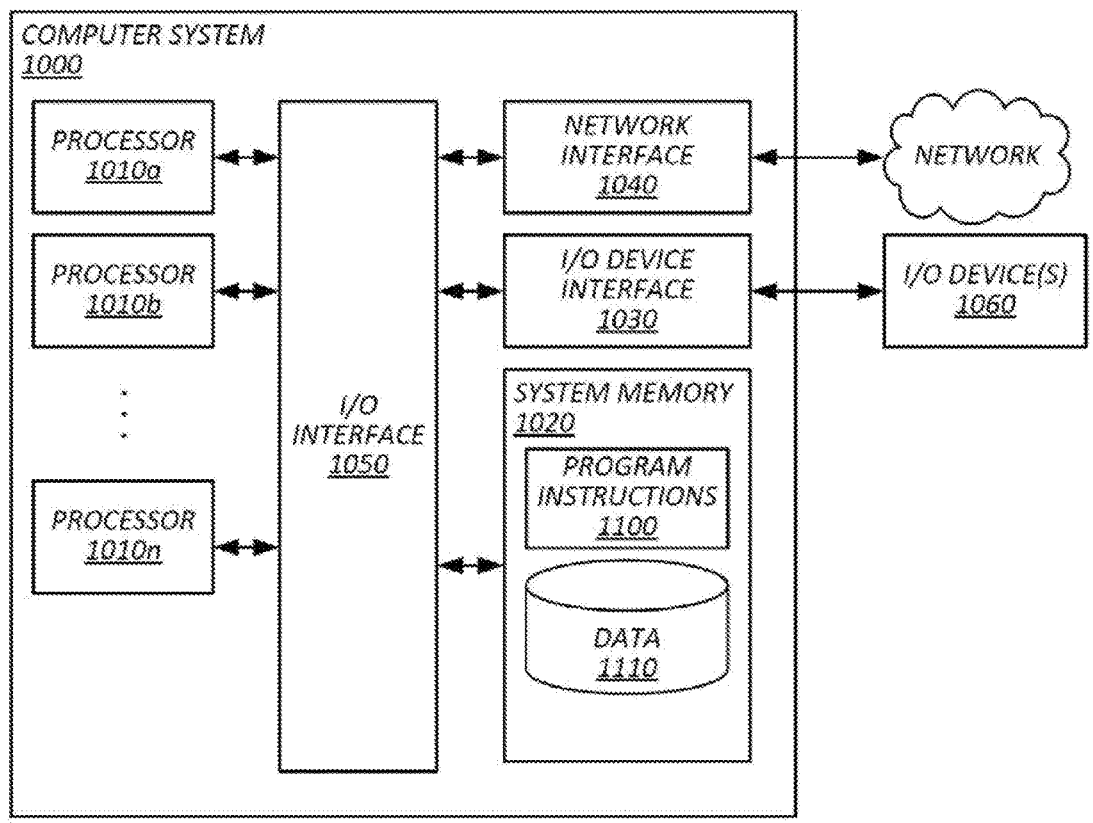
FIG. 5 is an example of a computer by which some of the present techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. One or more tangible, non-transitory, machine-readable media storing instructions that when executed by one or more computers effectuate operations comprising: sending, via a first channel, to a client computing device, a challenge of a test to determine whether a human or a computer is generating input; receiving, via a second channel, a response to the challenge, wherein the second channel and the first channel are not both accessible to a client-application in which the response is input, and wherein the test includes an image recognition task by which the response is determined from the challenge; and determining whether a human or computer generated the response based on performance in the image recognition task indicated by the response.

2. The media of clause 1, wherein: the challenge is a challenge of a CAPTCHA; the challenge specifies a geographic location; the first channel comprises a first port of the client computing device inaccessible to a web browser executing on the client computing device and accessible to a CAPTCHA-application executing on the client computing device, the CAPTCHA-application being configured to receive the challenge and present the challenge to the user outside of a webpage in which the response is to be entered; the client application in which the response is input is a web browser executing on the client computing device; and the operations comprise: sending, via the second channel, to a second port of the client computing device the webpage in which the response is to be entered, the second port being different from the first port, wherein the webpage includes an image of a map to be rendered in the web browser; and after sending the webpage, receiving an identification of the geographic location in the map.

3. The media of any of clauses 1-2, wherein: the challenge specifies a geographic location; the response indicates a location selected in a map presented in a user interface; determining whether a human or computer is generating input based on the received response comprises determining whether the location selected in the map corresponds to the geographic location.

4. The media of any of clauses 1-3, wherein: the challenge specifies a sequence of geographic locations; and the response indicates a sequence of locations selected on the map.

5. The media of any of clauses 1-4, wherein the operations comprise: sending, via the first channel, the challenge to a first application executing on the client computing device; and receiving, via the second channel, the response from a second application executing on the client computing device, the second application being a different application from the first application.

6. The media of any of clauses 1-, wherein: the operations of clause 1 are performed by at least one server-side application; operations comprise a first client-side application performing operations comprising: receiving the challenge and presenting the challenge to a user without providing access to the challenge to a second client-side application through which the response is entered.

7. The media of clause 6, wherein: program state of the first client-side application including the challenge is inaccessible to the second client-side application.

8. The media of clause 6, wherein the first client-side application is a CAPTCHA-application executing as a separate process from the second client-side application, wherein the second client-side application is a web browser.

9. The media of clause 6, wherein: the first client-side application is a web browser; and the second client-side application is a CAPTCHA-application executing as a separate process from the web browser.

10. The media of any of clauses 1-9, the operations comprise: sending, via the first channel, the challenge to a first client computing device; and receiving, via the second channel, the response from a second client computing device, the second computing device being a different computing device from the first computing device.

11. The media of clause 10, wherein: sending the challenge to the first client computing device comprises sending a text message to a mobile computing device; and receiving the response comprises receiving a hypertext transport protocol request or response from a web browser.

12. The media of clause 10, wherein: sending the challenge to the first client computing device comprises sending the challenge to a web browser through which a user is requesting access to resources protected by the test to determine whether a human or a computer is generating input; and receiving the response comprises receiving the response from a native application executing on a mobile computing device.
13. The media of any of clauses 1-12, wherein: sending the challenge is performed by a first server-side application operated by a first entity; receiving the response is performed by a second server-side application operated by a second entity different from the first entity and at different network address from the first server-side application.
14. The media of any of clauses 1-13, wherein the operations comprise: receiving, at a first server-side application operated by a first entity, from a second server-side application operated by a second entity, an identifier of a client-side application, wherein: the client-side application executes on a client computing device requesting access to resources of the second server-side application protected by the test to determine whether a human or a computer is generating input.
15. The media of clause 14, wherein the operations comprise: communicating, between the first server-side application and the client-side application, the challenge by establishing a communication session based on the identifier.
16. The media of clause 14, wherein the operations comprise: communicating, between the first server-side application and the client-side application, the response by establishing a communication session based on the identifier.
17. The media of clause 14, comprising: determining that the second server-side application has registered with the first server-side application; and determining that the client-side application has registered with the first server-side application.
18. The media of any of clauses 1-17, wherein: sending the challenge comprises: steps for sending a challenge via different channel from which a response is received; steps for obtaining and validating a token; steps for determining whether an application server is registered; receiving the response to the challenge comprises steps for receiving a response to a challenge; and determining whether a human or computer is generating input comprises steps for determining whether a human or computer is generating input.
19. The media of any of clauses 1-18, comprising: in response to determining that a human is generating input, providing services of an application protected by the test to determine whether a human or a computer is generating input.
20. A method comprising: the operations of any of clauses 1-19.
21. A system, comprising: one or more processors; and memory storing instructions that when executed by at least some of the processors cause the processors to effectuate operations comprising: the operations of any of clauses 1-19.

What is claimed is:

1. One or more tangible, non-transitory, machine-readable media storing instructions that when executed by one or more computers effectuate operations comprising:
   sending, via a first channel, to a client computing device, a challenge of a test to determine whether a human or a computer is generating input;
   receiving, via a second channel, a response to the challenge, wherein the second channel and the first channel are not both accessible to a client-application in which the response is input, and wherein the test includes an image recognition task by which the response is determined from the challenge; and
   determining whether a human or computer generated the response based on performance in the image recognition task indicated by the response, wherein:
   the challenge is a challenge of a CAPTCHA,
   the challenge specifies a geographic location,
   the first channel comprises a first port of the client computing device inaccessible to a web browser executing on the client computing device and accessible to a CAPTCHA-application executing on the client computing device, the CAPTCHA-application being configured to receive the challenge and present the challenge to the user outside of a webpage in which the response is to be entered,
   the client-application in which the response is input is a web browser executing on the client computing device, and
   the operations comprise:
   sending, via the second channel, to a second port of the client computing device the webpage in which the response is to be entered, the second port being different from the first port, wherein the webpage includes an image of a map to be rendered in the web browser; and
   after sending the webpage, receiving an identification of the geographic location in the map.

2. The media of claim 1, wherein:
the response indicates a location selected in a map presented in a user interface;
determining whether a human or computer is generating input based on the received response comprises determining whether the location selected in the map corresponds to the geographic location.

3. The media of claim 1, wherein:
the challenge specifies a sequence of geographic locations; and
the response indicates a sequence of locations selected on the map.

4. The media of claim 1, wherein the operations comprise:
sending, via the first channel, the challenge to a first application executing on the client computing device; and
receiving, via the second channel, the response from a second application executing on the client computing device, the second application being a different application from the first application.

5. The media of claim 1, wherein:
the operations of claim 1 are performed by at least one server-side application; and
operations comprise a first client-side application performing operations comprising:
receiving the challenge and presenting the challenge to a user without providing access to the challenge to a second client-side application through which the response is entered.

6. The media of claim 5, wherein:
program state of the first client-side application including the challenge is inaccessible to the second client-side application.

7. The media of claim 5, wherein the first client-side application is the CAPTCHA-application executing as a separate process from the second client-side application, wherein the second client-side application is the web browser.

8. The media of claim 1, wherein:
   sending the challenge is performed by a first server-side application operated by a first entity; and
   receiving the response is performed by a second server-side application operated by a second entity different from the first entity and at a different network address from the first server-side application.

9. The media of claim 1, wherein:
   sending the challenge comprises:
      steps for sending a challenge via different channel from which a response is received;
      steps for obtaining and validating a token; and
      steps for determining whether an application server is registered;
   receiving the response to the challenge comprises steps for receiving a response to a challenge; and
   determining whether a human or computer is generating input comprises steps for determining whether a human or computer is generating input.

10. The media of claim 1, wherein the operations comprise:
    in response to determining that a human is generating input, providing services of an application protected by the test to determine whether a human or a computer is generating input.

11. A method, comprising:
    sending, by a processor, via a first channel, to a client computing device, a challenge of a test to determine whether a human or a computer is generating input;
    receiving, by a processor, via a second channel, a response to the challenge, wherein the second channel and the first channel are not both accessible to a client-application in which the response is input, and wherein the test includes an image recognition task by which the response is determined from the challenge; and
    determining, by a processor, whether a human or computer generated the response based on performance in the image recognition task indicated by the response, wherein:
    the challenge is a challenge of a CAPTCHA,
    the challenge specifies a geographic location,
    the first channel comprises a first port of the client computing device inaccessible to a web browser executing on the client computing device and accessible to a CAPTCHA-application executing on the client computing device, the CAPTCHA-application being configured to receive the challenge and present the challenge to the user outside of a webpage in which the response is to be entered,
    the client-application in which the response is input is a web browser executing on the client computing device, and
    the method comprises:
       sending, via the second channel, to a second port of the client computing device the webpage in which the response is to be entered, the second port being different from the first port, wherein the webpage includes an image of a map to be rendered in the web browser; and
       after sending the webpage, receiving an identification of the geographic location in the map.

12. The method of claim 11, wherein:
    the response indicates a location selected in a map presented in a user interface; and
    determining whether a human or computer is generating input based on the received response comprises determining whether the location selected in the map corresponds to the geographic location.

13. The method of claim 11, wherein:
    sending the challenge, receiving the response, and determining whether a human or computer generated the response are performed by at least one server-side application communicating with a first client-side application performing operations comprising receiving the challenge and presenting the challenge to a user without providing access to the challenge to a second client-side application through which the response is entered.

14. The method of claim 13, wherein:
    program state of the first client-side application including the challenge is inaccessible to the second client-side application.

15. The method of claim 11, wherein:
    the challenge specifies a sequence of geographic locations; and
    the response indicates a sequence of locations selected on the map.

16. The method of claim 11, wherein:
    the method of claim 11 is performed by at least one server-side application; and
    the method comprises a first client-side application performing operations comprising:
       receiving the challenge and presenting the challenge to a user without providing access to the challenge to a second client-side application through which the response is entered.

17. The method of claim 11, comprising:
    sending, via the first channel, the challenge to a first application executing on the client computing device; and
    receiving, via the second channel, the response from a second application executing on the client computing device, the second application being a different application from the first application.

18. The method of claim 17, wherein the first client-side application is the CAPTCHA-application executing as a separate process from the second client-side application, wherein the second client-side application is the web browser.

19. The method of claim 11, wherein:
    sending the challenge is performed by a first server-side application operated by a first entity; and
    receiving the response is performed by a second server-side application operated by a second entity different from the first entity and at a different network address from the first server-side application.

20. The method of claim 11, comprising:
    receiving, at a first server-side application operated by a first entity, from a second server-side application operated by a second entity, an identifier of a client-side application, wherein:
       the client-side application executes on a client computing device requesting access to resources of the second server-side application protected by the test to determine whether a human or a computer is generating input.

21. The method of claim 20, comprising:
communicating, between the first server-side application and the client-side application, the challenge by establishing a communication session based on the identifier.

22. The method of claim 20, comprising:
communicating, between the first server-side application and the client-side application, the response by establishing a communication session based on the identifier.

23. The method of claim 20, comprising:
determining that the second server-side application has registered with the first server-side application; and
determining that the client-side application has registered with the first server-side application.

24. The method of claim 11, wherein:
sending the challenge comprises:
  steps for sending a challenge via different channel from which a response is received;
  steps for obtaining and validating a token; and
  steps for determining whether an application server is registered;
receiving the response to the challenge comprises steps for receiving a response to a challenge; and
determining whether a human or computer is generating input comprises steps for determining whether a human or computer is generating input.

25. The method of claim 11, comprising:
in response to determining that a human is generating input, providing services of an application protected by the test to determine whether a human or a computer is generating input.

* * * * *